(12) United States Patent
Andou

(10) Patent No.: US 7,220,980 B2
(45) Date of Patent: May 22, 2007

(54) CASSETTE INSERTION OPENING STRUCTURE AND RADIATION IMAGE READING APPARATUS

(75) Inventor: Masakazu Andou, Hino (JP)

(73) Assignee: Konica Minolta Medical & Graphics, Inc., Tokyo (JP)

( * ) Notice: Subject to any disclaimer, the term of this patent is extended or adjusted under 35 U.S.C. 154(b) by 0 days.

(21) Appl. No.: 11/294,695

(22) Filed: Dec. 5, 2005

(65) Prior Publication Data

US 2006/0124877 A1 Jun. 15, 2006

(30) Foreign Application Priority Data

Dec. 15, 2004 (JP) ............................. 2004-362861

(51) Int. Cl.
*G01N 23/04* (2006.01)
(52) U.S. Cl. .................................................... 250/589
(58) Field of Classification Search ................ 250/589; 378/172, 169
See application file for complete search history.

(56) References Cited

U.S. PATENT DOCUMENTS

| | | | | |
|---|---|---|---|---|
| 4,889,989 A | * | 12/1989 | Yoshimura et al. | ......... 250/589 |
| 5,308,994 A | * | 5/1994 | Ohta et al. | .................. 250/589 |
| 5,675,156 A | * | 10/1997 | Boeve et al. | ............... 250/589 |
| 5,721,436 A | * | 2/1998 | Boeve et al. | ............... 250/589 |
| 6,191,426 B1 | * | 2/2001 | Hayakawa et al. | ...... 250/484.4 |
| 6,365,909 B1 | * | 4/2002 | Hayakawa et al. | ......... 250/584 |
| 2006/0124875 A1 | * | 6/2006 | Yonekawa et al. | ......... 250/580 |

FOREIGN PATENT DOCUMENTS

| | | |
|---|---|---|
| JP | 2000-57757 A | 2/2000 |
| JP | 2003-270745 A | 9/2003 |
| JP | 2004-101988 A | 4/2004 |
| JP | 2004-102066 A | 4/2004 |
| JP | 2004-102078 A | 4/2004 |

\* cited by examiner

*Primary Examiner*—David Porta
*Assistant Examiner*—Mark R. Gaworecki
(74) *Attorney, Agent, or Firm*—Frishauf, Holtz, Goodman & Chick, P.C.

(57) ABSTRACT

A substantially rectangular insertion opening is formed on the upper surface of the housing of the radiation image reading device. An L-shaped projecting portion which runs from the back side periphery to the right side periphery of the insertion opening is integrally formed with the housing and the projecting portion protrudes above the upper surface of the housing, and the top surface of the projecting portion is higher than the upper surface of the housing. When the cassette is inserted into the insertion opening, if the cassette is allowed to come in contact with the side surface of the projecting portion, positioning of the cassette at the insertion opening is simpler. As a result, quicker and easier insertion of the cassette into the insertion opening becomes possible.

3 Claims, 9 Drawing Sheets

CASSETTE INSERTION OPENING STRUCTURE AND RADIATION IMAGE READING APPARATUS

This application is based on Japanese Patent Application No. 2004-362861 filed on Dec. 15, 2004 in Japanese Patent Office, the entire content of which is hereby incorporated by reference.

BACKGROUND OF THE INVENTION

This invention relates to a cassette insertion opening structure for inserting a cassette, in which a stimulable phosphor is stored, into a radiation image reading apparatus and also relates to the apparatus on which the insertion opening is provided.

In the past, a stimulable phosphor sheet that is stored in a box-shaped cassette has been used in order to record radiation images which are typically X-ray images for the purpose of medical diagnosis and the like. The stimulable phosphor sheet is one in which a layer of a stimulable phosphor is formed on a support and covered with a protective layer. The stimulable phosphor accumulates radiation energy such as the irradiated X-rays and the like, and also releases the stored energy as photo-stimulated luminescence by irradiating excitation light of a prescribed wavelength.

Generally, after a radiation image is recorded on the stimulable phosphor sheet that is stored in the cassette using the radiographing device, the radiation image recorded on the stimulable phosphor sheet is outputted to a film using an outputting device, and/or the radiation image is displayed as a visible image on a display device.

A radiation image reading device which reads out the radiation image from the stimulable phosphor sheet is used in order to output the radiation image on the stimulable phosphor sheet as a visible image. Examples of the radiation image reading apparatus include those disclosed in Patent Documents 1, 2, and 3. In each of these radiation image reading apparatuses, a light scanning unit for irradiating a scanning beam on the stimulable phosphor sheet and a sensor unit for electrically reading the photo-stimulated luminescence emitted from the stimulable phosphor sheet by means of a scanning beam are provided inside the housing. In addition, an insertion opening is formed on the housing and the cassette is inserted into the housing through the insertion opening.

However, because the insertion opening is formed as narrow and rectangular, when the cassette is inserted into the insertion opening, positioning of the cassette at the insertion opening is difficult. That is to say, the cassette must be aimed at the insertion opening for insertion therein and thus the cassette cannot be easily handled for inserting it into the insertion opening.

[Patent Document 1] Unexamined Japanese Patent Application Publication No. Tokkai 2004-101988

[Patent Document 2] Unexamined Japanese Patent Application Publication No. Tokkai 2004-102066

[Patent Document 3] Unexamined Japanese Patent Application Publication No. Tokkai 2004-102078

SUMMARY OF THE INVENTION

Thus the present invention was conceived in view of solving the above-described problems, and an object thereof is to provide an insertion opening structure in which the cassette can be easily inserted, as well as a radiation image reading apparatus with the insertion opening.

This object is achieved by the structure and apparatus described below.

(A) A cassette insertion opening structure for inserting a cassette in which a stimulable phosphor sheet is stored into an apparatus, wherein, the insertion opening is formed on a housing of an apparatus and the height of the surface adjoining at least one of the four peripheries of the insertion opening differs from the remaining peripheries.

(B) A radiation image reading apparatus for reading radiation images from a stimulable phosphor sheet stored in a cassette in the housing, wherein the insertion opening is formed on the housing of the apparatus and the height of the surface adjoining at least one of the four peripheries of the insertion opening differs from the remaining peripheries.

DETAILED DESCRIPTION OF THE PREFERRED EMBODIMENT

In order to solve the above-described problems, the structure related to Item (A) is a cassette insertion opening structure for inserting a cassette in which a stimulable phosphor sheet is stored into an apparatus, wherein the insertion opening is formed on a housing of an apparatus and the height of the surface adjoining at least one of the four peripheries of the insertion opening differs from the remaining peripheries.

The apparatus related to Item (B) is a radiation image reading apparatus for reading radiation images from a stimulable phosphor sheet stored in a cassette in the housing, wherein the insertion opening is formed on the housing of the apparatus and the height of the surface adjoining at least one of the four peripheries of the insertion opening differs from the remaining peripheries.

In the structure and apparatus related to Items (A) and (B), because the height of the surface adjoining at least one of the four peripheries of the insertion opening differs from the remaining peripheries, a cassette can be positioned at the insertion opening by allowing the cassette to contact a portion where a surface adjoining a periphery of the insertion opening is higher than the other portion. As a result, insertion of the cassette is quicker and simpler.

In this invention, it is preferable that the insertion opening has an approximately rectangular configuration, and a surface adjoining at least one of the four peripheries of the insertion opening is higher than the surface adjoining the other peripheries and it is more preferable that a projecting portion which is along at least one of the four peripheries of the insertion opening is formed on the housing and the top surface of the projecting portion is higher than the surface adjoining the other peripheries.

Because of the above configuration, if the cassette is allowed to contact the side of the periphery having a high surface among the four peripheries, the cassette can be easily positioned at the insertion opening, and insertion of the cassette is quicker and simpler.

In this invention, it is preferable that the insertion opening is formed on the upper surface of the housing.

Due to the above configuration, because the insertion opening is formed on the upper surface of the housing, even, if the height of the apparatus is low, the cassette can be easily inserted into the insertion opening.

The preferable embodiment for realizing this invention will now be described using drawings. In the following description of the embodiments, various technologically favorable restrictions have been included in realizing this invention. However, the scope of the invention is not limited to the following embodiments and drawings.

First Embodiment

Figure 1:
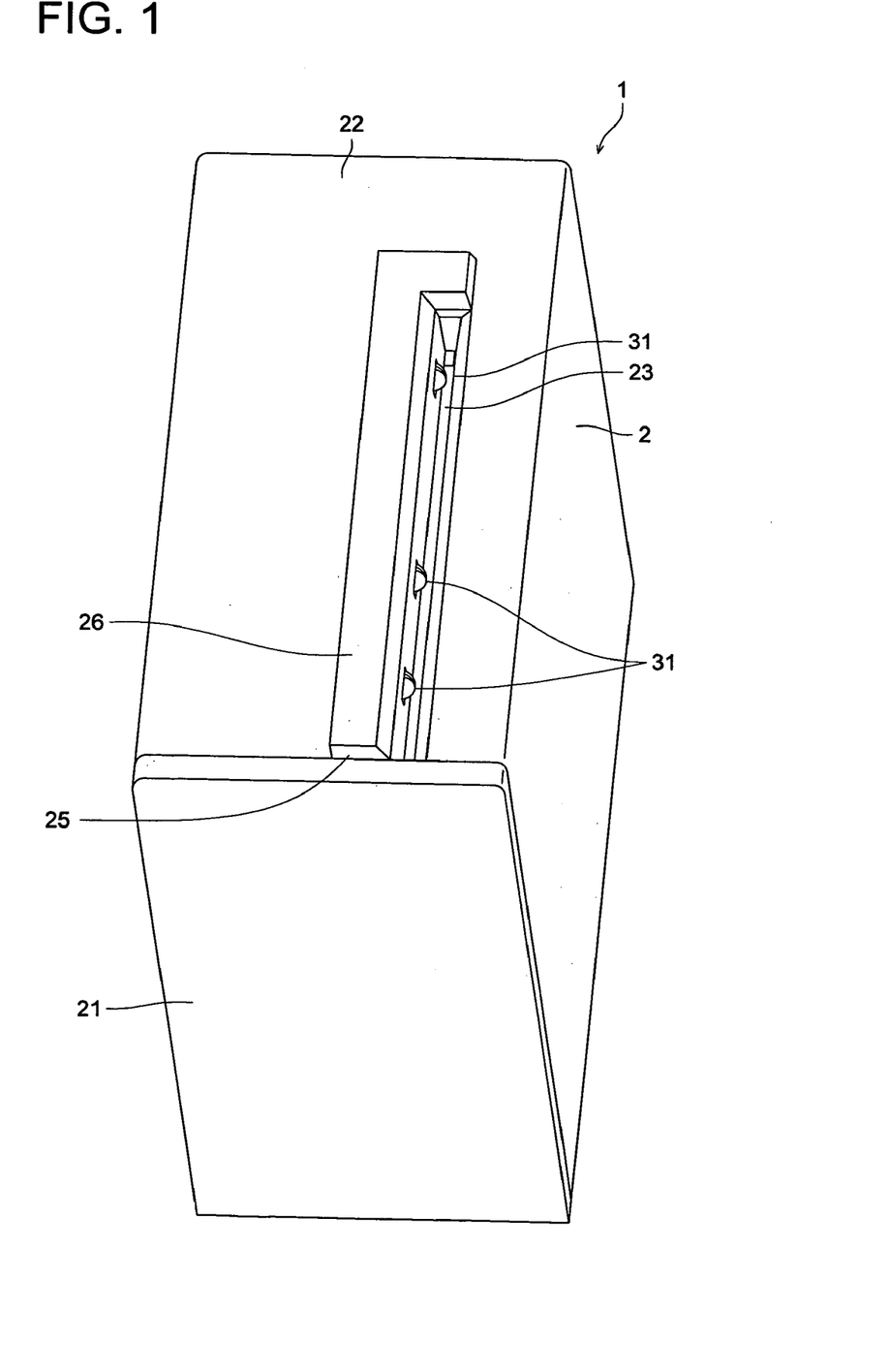
FIG. 1 is a perspective view of an exterior of the radiation image reading apparatus 1 showing the upper surface, the front surface and the left side surface.

FIG. 1 is a perspective view of the radiation image reading apparatus 1 in an embodiment in which this invention is applied, showing the upper surface, the front surface and the left side surface.

As shown in FIG. 1, the radiation image reading apparatus 1 has a housing 2 having an approximately rectangular box shape, and the radiation image reading apparatus 1 is formed by providing various members and mechanisms in the housing 2.

Figure 2:
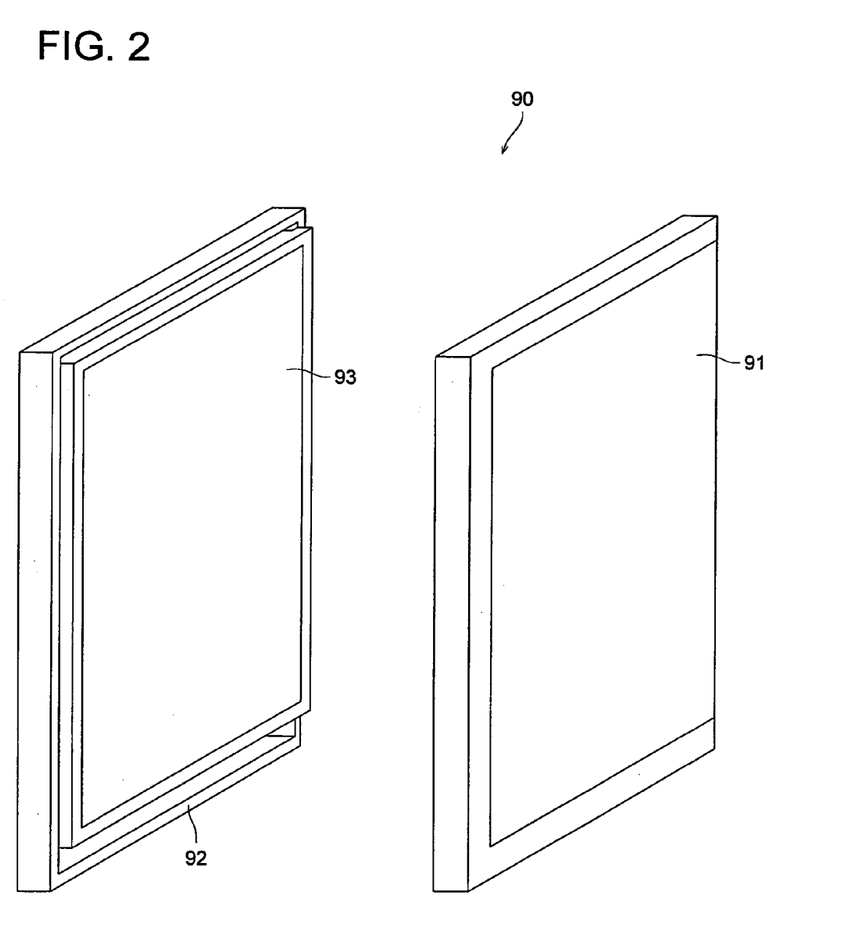
FIG. 2 is an exploded perspective view of the cassette 90.

The height from the floor to the upper surface 22 of the housing 2 is preferably 700 mm or less. The left side surface of the housing 2 has a cover 21 that can be opened and closed. A rectangular insertion opening 23 which extends in the longitudinal direction is formed on the upper surface 22 of the housing 2. The cassette 90 shown in FIG. 2 is inserted into the housing 2 through the insertion opening 23.

The cassette 90 will be described using the exploded perspective view in FIG. 2. The cassette 90 has a hollow rectangular base. More specifically, the cassette 90 comprises a box-shaped back base 92 which is open at the front side; a box-shaped front base 91 which is open at the back side, and a stimulable phosphor sheet 93 which is attached to the back base 92 in a state where the front surface faces to the front side. The front surface of, the stimulable phosphor sheet 93 is covered by the front base 91 in a state where it faces the front base 91, and the back base 92 is fit into the front base 91, and the stimulable phosphor sheet 93 is attached in the inner space formed by the front base 91 and the back base 92. The back base 92 comprises a material that is attracted by magnetic force.

In addition, the front base 91 is separable from the back base 92, and when these are separated, the stimulable phosphor sheet 93 is exposed. In addition, the front base 91 and the back base 92 respectively have engagement portions (not shown), and the front base 91 and the back base 92 are locked when these engagement portions engage with each other, while the front base 91 and the back base 92 are separated when the engagement portions are released from each other. The cassette 90 has a bar code which indicates the size of the cassette 90 and the like.

The stimulable phosphor sheet 93 may be one in which a stimulable phosphor layer is formed by coating a stimulable phosphor such as BaFBr:Eu or BaFI:Eu on a support, or by vapor-depositing a stimulable phosphor such as CsBr:Eu on a support to form a columnar crystal stimulable phosphor layer.

Figure 3:
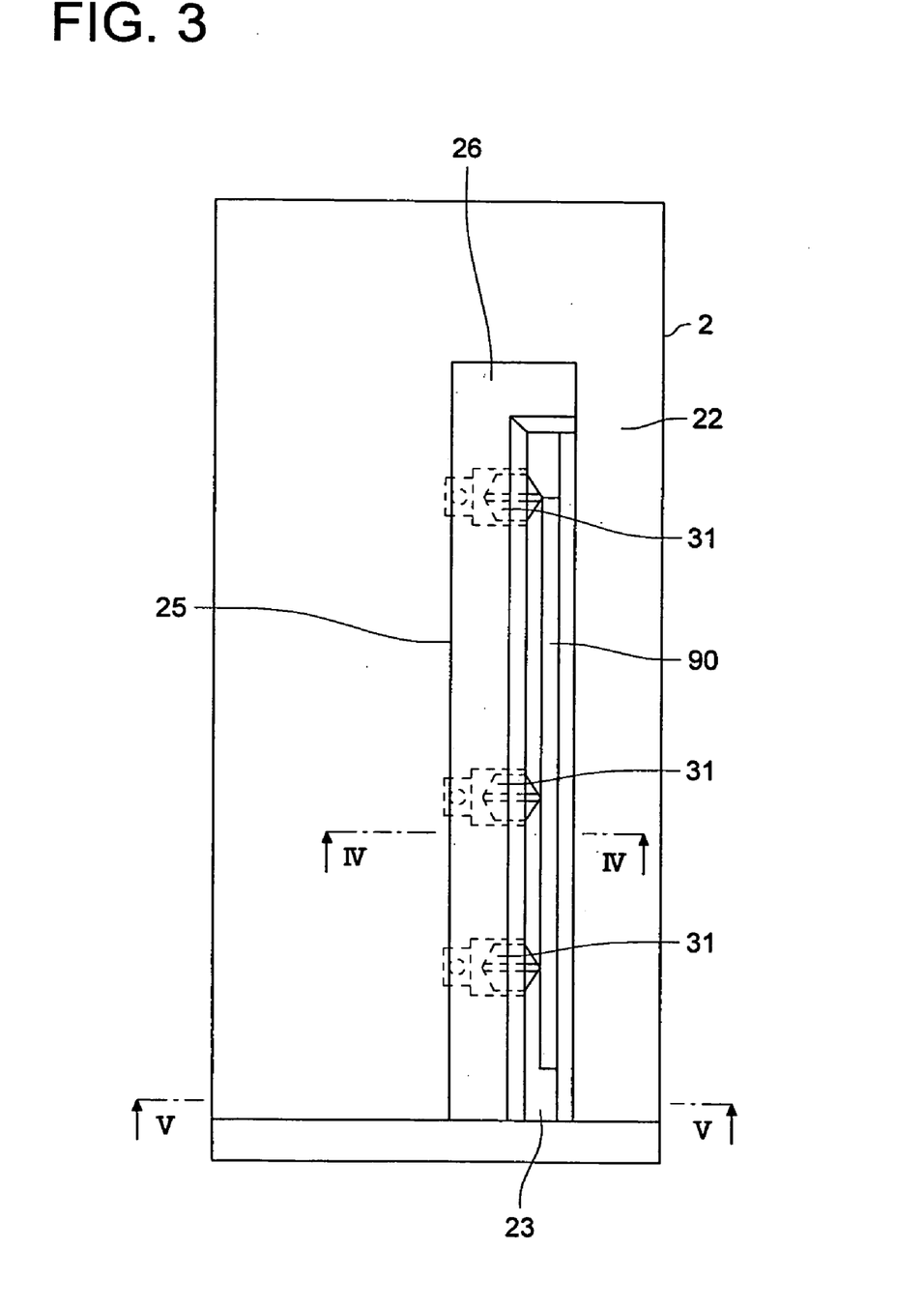
FIG. 3 is a view of the upper surface of the radiation image reading apparatus 1.

The insertion structure at the periphery of the insertion opening 23 will be described using FIGS. 3 and 4. FIG. 3 shows a view of the upper surface of the radiation image reading apparatus 1, and FIG. 4 is a cross-sectional view of the surface along, section line IV—IV in FIG. 3.

Figure 4:
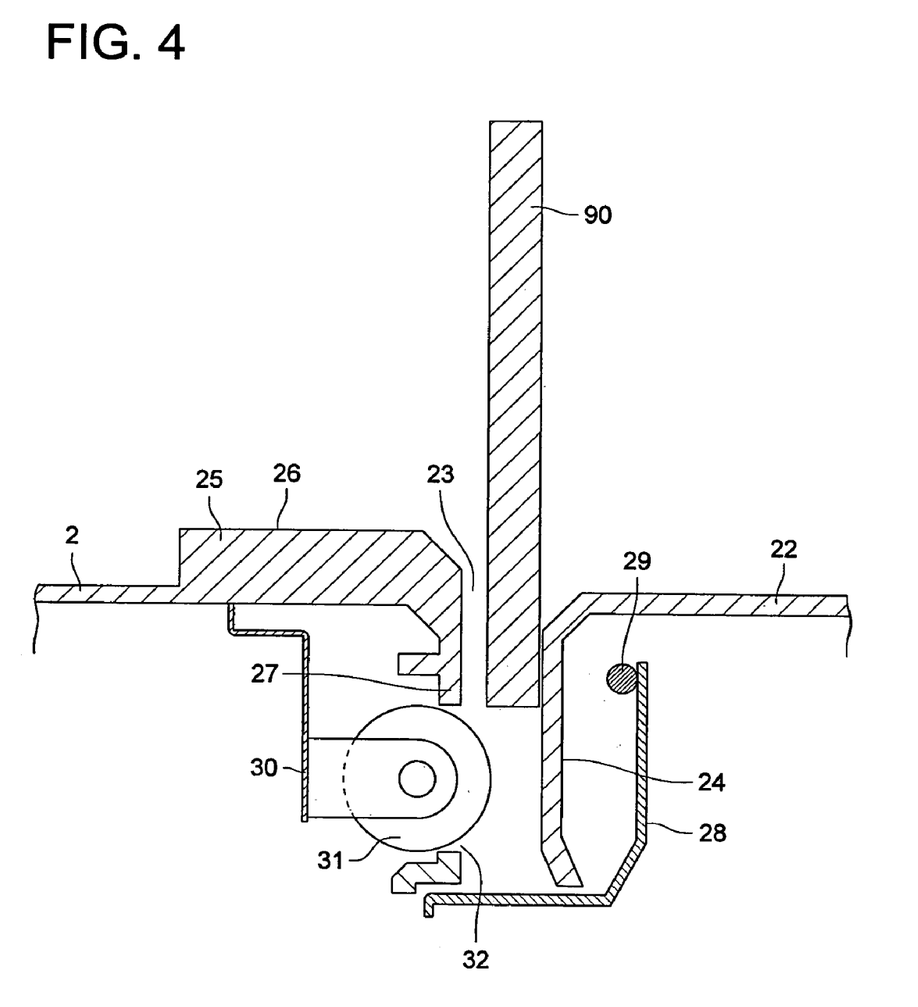
FIG. 4 is a cross-sectional view along the section line IV—IV in FIG. 3.

As shown in FIGS. 3 and 4, a side wall 24 which is along the front side periphery of the insertion opening 23 is integrally formed with the housing 2, and the side wall 24 projects inward in the housing 2. The side wall 24 is substantially at right angle with respect to the upper surface 22 of the housing 2. The edge between, the side wall 24 and the upper surface 22 is beveled.

The height of the surfaces adjoining the peripheries of the insertion opening 23 differ in accordance with the position along the periphery. More specifically, an L-shaped projecting portion 25 which runs from the back side periphery to the left side periphery of the insertion opening is integrally formed with the housing 2 and projecting portion 25 protrudes above the upper surface 22 of the housing 2, and the top surface 26 of the projecting portion 25 is higher than the upper surface 22 of the housing 2. As a result, there is a step between the top surface 26 of the projecting portion 25 which adjoins the right periphery and the back periphery among the 4 peripheries of the insertion opening 23 and the upper surface which adjoins the front periphery and the left periphery.

The side wall 27 along the back periphery of the insertion opening 23 is formed integrally with the side wall 27 and the side wall 27 projects inward in the housing 2. The side wall 27 is substantially at right angle with respect to the top surface 26 of the projecting portion 25 and the edge between the side wall 27 and the top surface 26 is beveled.

A shutter member 28 is disposed under the insertion opening 23. The shutter member 28 is connected to a hinge 29 which is provided on the front side of the insertion opening 23 inside the housing 2. The hinge 29 has its axis in the longitudinal direction and the shutter member 28 is rotated around the hinge 29 by the open-close motor 33 (shown in FIG. 5), and the insertion opening 23 is opened and closed by the shutter member 28.

In the back side of the side wall 27, a flat metal spring 30 is provided inside the housing 2. The rollers 31 are mounted on the flat metal springs 30 and the rollers 31 are rotatable around the axis disposed in the longitudinal direction. A plurality of rollers 31 are disposed in the longitudinal direction, and flat metal springs 30 are provided corresponding to respective rollers 31.

Through-holes 32 are formed in the side wall 27 so as to correspond to each of the rollers 31, and a part of the roller 31 projects from the back side of the side wall 27 to the front side of the side wall 27 through the through-hole 32.

In addition, in the right side position close to the insertion opening 23, a bar code reader which reads a bar code on the cassette 90 is provided.

Figure 5:
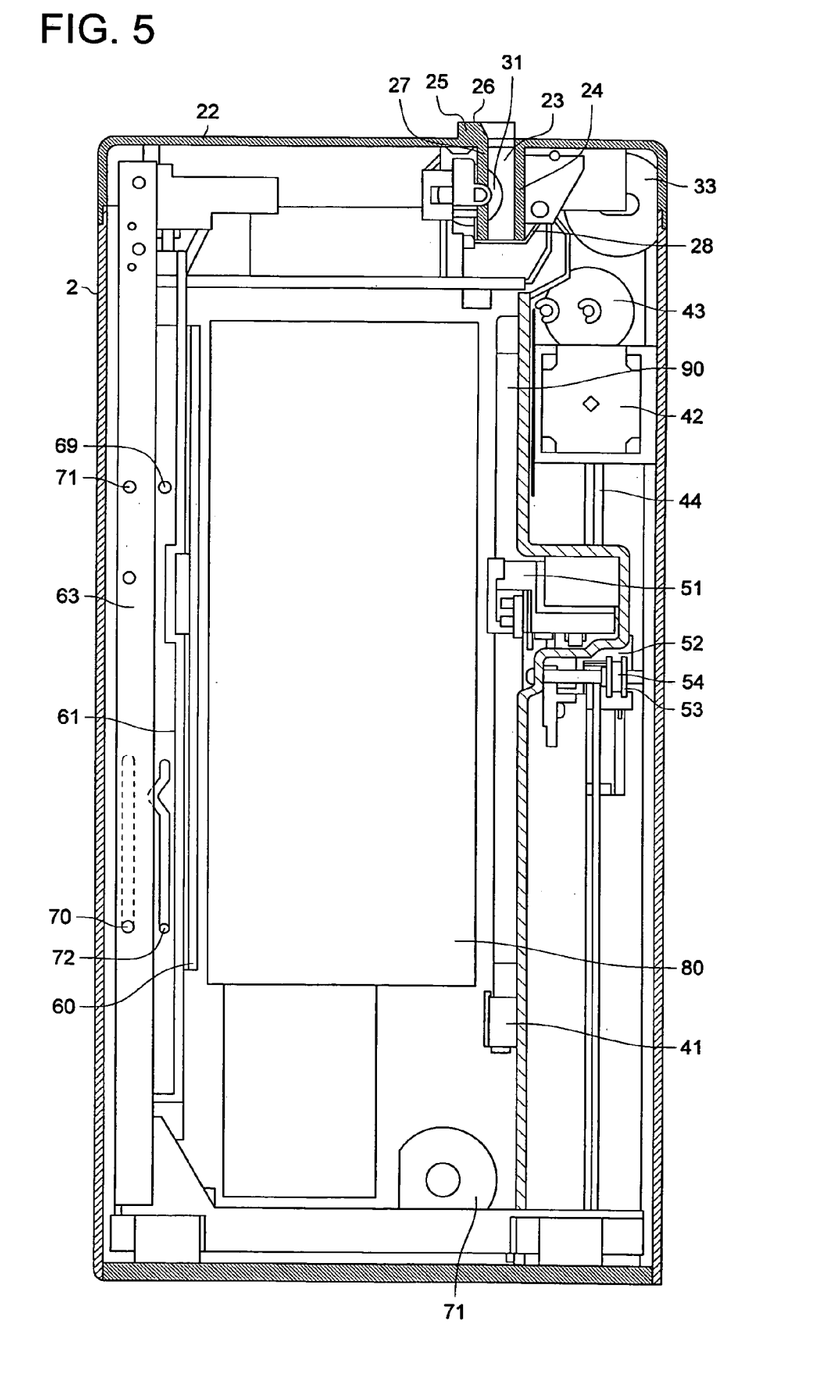
FIG. 5 is a cross-sectional view along the section line V—V in FIG. 3.

The configuration of the inside of the housing 2 will be described using FIG. 5. FIG. 5 is a cross sectional view of the surface along section line V—V of the housing 2. As shown in FIG. 5, an elevator platform 41 on which the inserted cassette 90 is loaded is under the insertion opening 23. The elevator platform 41 is provided such that it can be moved vertically by the guide members that extend vertically inside the housing 2. The moving force of the elevating motor 42 is transferred to the elevator platform 41 by a pulley 43 and an endless belt 44 and the like and the elevator platform 41 is thus elevated. The cassette 90 is moved up and down due to the vertical movement of the elevator platform 41.

Two guide portions 51 are positioned left and right of each other at the lower side of the insertion opening 23. The two guide portions 51 are provided so as to move towards and away from each other in the longitudinal direction, and the driving force of the width adjusting motor 52 is transferred to the guide portion 51 through the pulley 53 and the endless belt 54 to thereby move the guide portion 51 horizontally. The front base 91 in particular, of the cassette 90 that is loaded on the elevator platform 41 is pinched between the two guide portions 51 which have approached each other and the position in the horizontal direction is adjusted. On the other hand the pinching of the cassette 90 is released by separating the guide portions 51 from each other. The elevator platform 41 or the guide portion 51 has a lock releasing mechanism for disengaging the engagement portion of the cassette 90.

Figure 6:
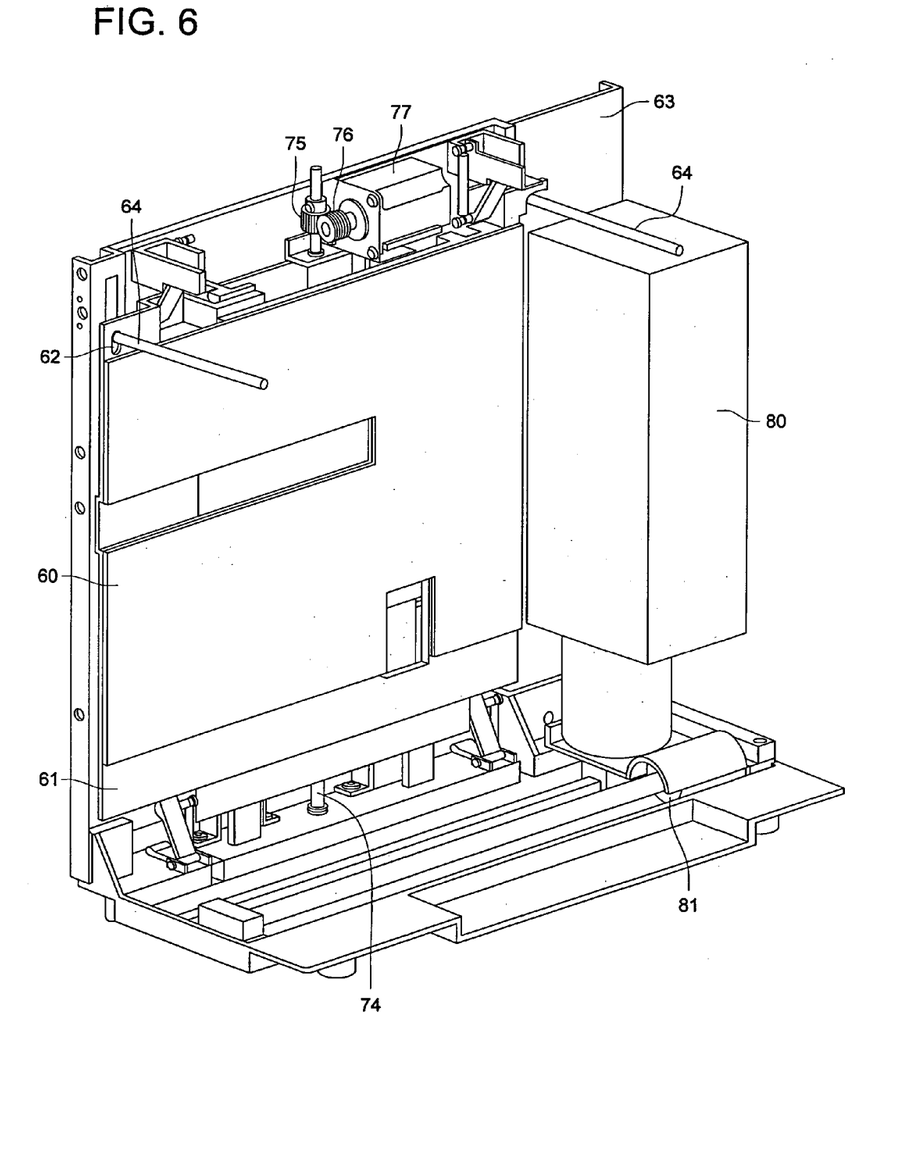
FIG. 6 is a perspective view of the inner structure of the radiation image reading apparatus 1 showing the upper surface, the front surface and the left side surface.
Figure 7:
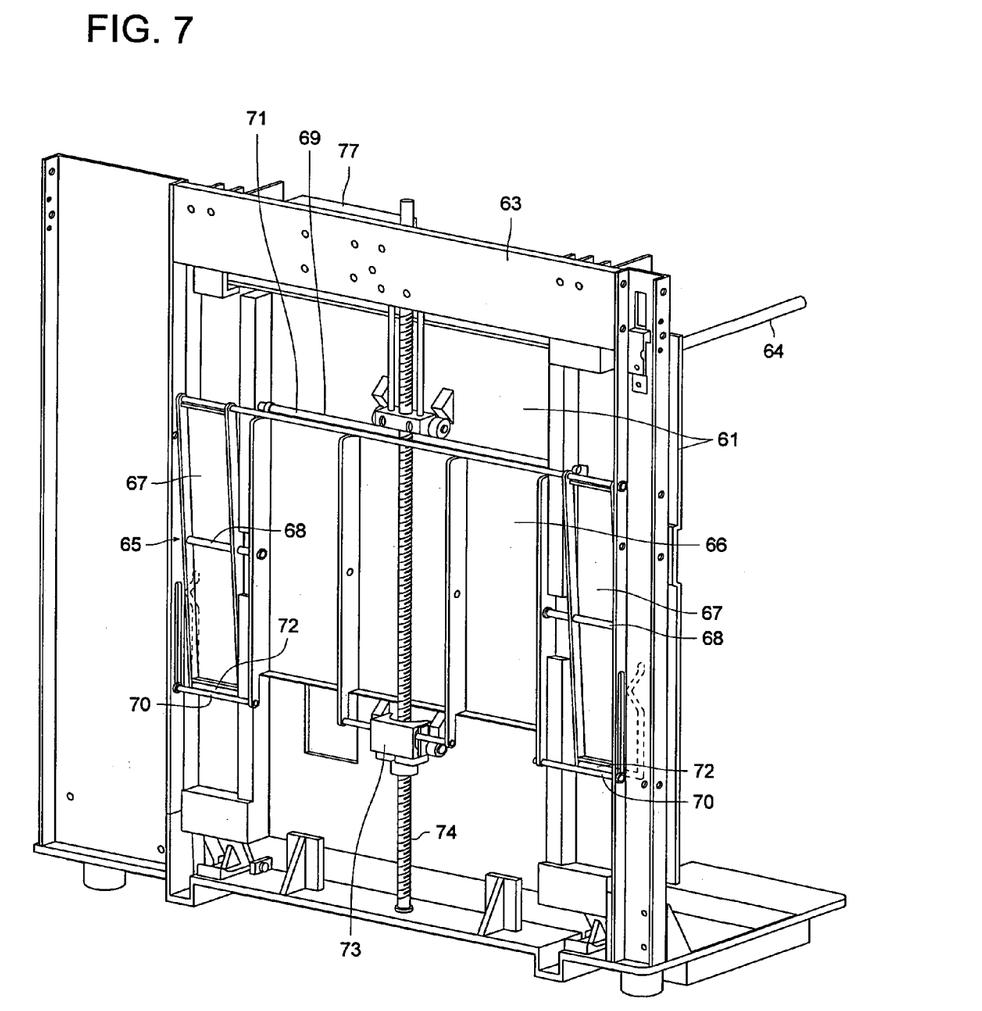
FIG. 7 is a perspective view of the inner structure of the radiation image reading apparatus 1 showing the upper surface, the back surface and the left side surface.

FIG. 6 shows the structure of the inside of the housing 2 and is a perspective view of, the front surface, the upper surface and the left side surface which are on the back side of the elevator platform 41. FIG. 7 shows the structure of the inside of the housing 2 and is a perspective view of the rear surface, the upper surface and the left side surface which are on the back side of the elevator platform 41.

As shown in FIGS. 6 and 7 a moving plate 61 is disposed on the back side of the elevator platform 41 and the guide portions 51 and a magnet 60 are provided on the front surface of the moving plate 61. A through-hole 62 is formed on the upper part of the moving plate 61, and the guide poles 64 are inserted into the through-hole 62. The guide poles 64 are provided so as to project frontward from the upper portion of the frame 63 which is fixed on the housing 2 in the back side of the housing, and the moving plate 61 is guided by the guide poles 64 so as to be movable back and forth.

Figure 8:
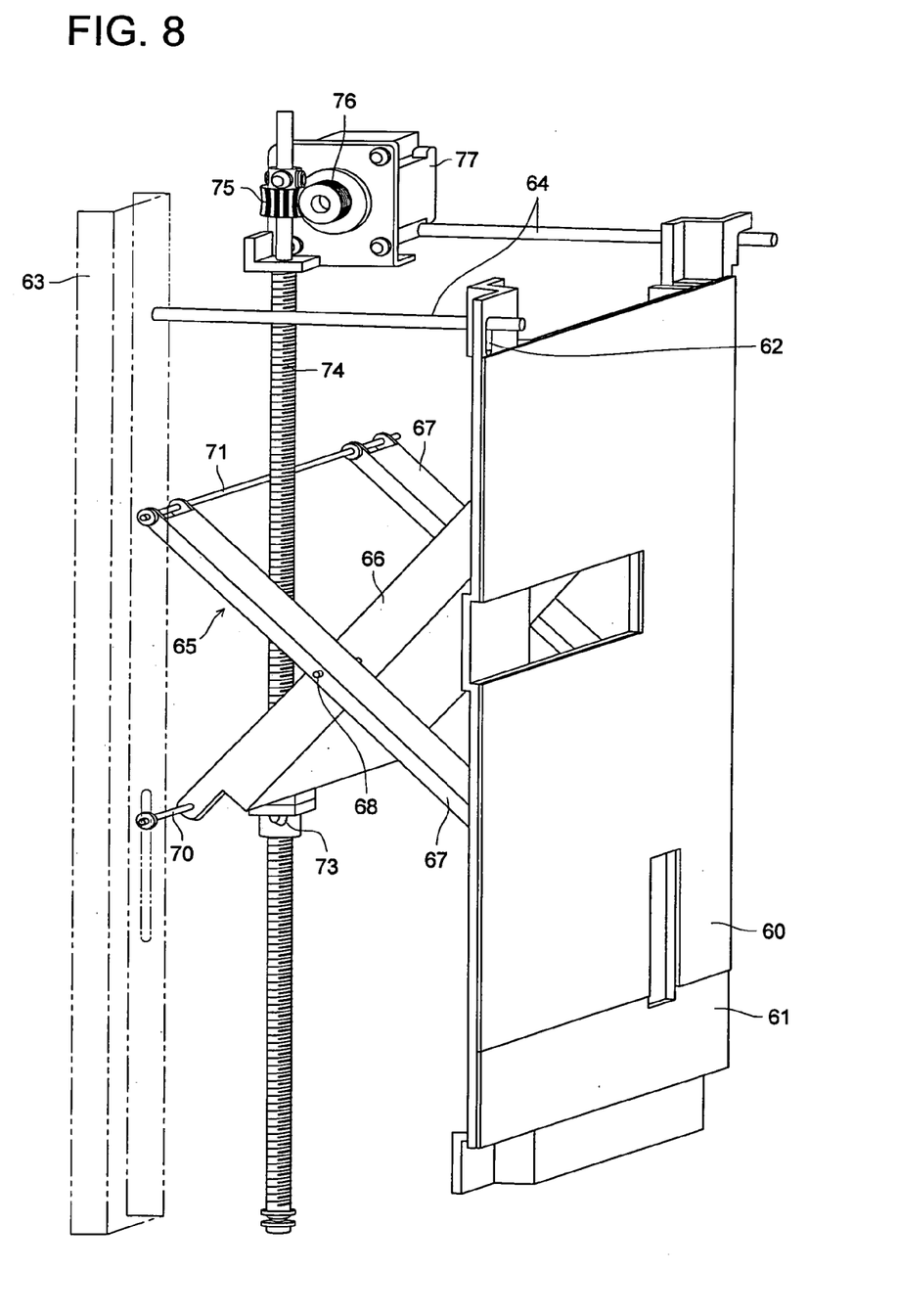
FIG. 8 is a perspective view showing the front surface, the upper surface and the left side surface when the link mechanism 65 is open.

The moving plate 61 is movable back and forth in a state parallel to the rear surface of the housing 2 using a link mechanism 65. The link mechanism 65 and the mechanism for driving the link mechanism 65 will be described referring to the FIGS. 6 to 8. FIG. 8 is a perspective view showing the front surface, the upper surface and the left side surface in a state in which the link mechanism 65 is open.

As shown in FIGS. 6 to 8, the link mechanism 65 is composed of a link piece 66, two link pieces 67, two axle members 68, and an axle member 69, two sliding axles 70, an axle member 71 and two sliding axles 72 which are disposed on the back side of the moving plate 61.

The middle portion of the link piece 67 is connected to the middle portion of the link piece 68 by the axle member 68 so as to be rotatable; one end of the link piece 67 is connected to the upper portion of the frame 63 by the axle member 71 so as to be rotatable; and the other end of the link piece 67 is connected to the lower portion of the moving plate 61 by the sliding axle 72 so as to be vertically movable.

One end of the link piece 66 is connected to the upper portion of the moving plate 61 by the axle member 69 so as to be rotatable, and the other end of the link piece 66 is connected to the lower portion of the frame 63 by the sliding axle 70 so as to be vertically movable.

In addition, the moving body 73 is connected to the other end of the link piece 66 and the other end of the link piece 66 is rotatable around the axle extending in the horizontal direction with respect to the moving body 73. The moving body 73 engages with a ball screw 74 which extends in the vertical direction and the ball screw 74 which is rotatable around its axis is mounted on the frame 63. The upper end of the ball screw 74 has a worm wheel 75 and a worm 76 meshes with the worm wheel 75 and the worm 76 is directly connected with the power loading axle of the motor 77.

The moving plate 61 is moved frontward by the motor 77 and the link mechanism 65 and as a result, the back base 92 of the cassette 90 which is loaded on the elevator platform 41 sticks to the magnet 60. Subsequently, the moving plate 61 moves toward the back side and as a result the back base 92 along with the moving plate 61 moves toward the back side.

As shown in FIGS. 5 and 6, an image reading section 80 is moved between the frame 63 and the elevator platform 41 in the horizontal direction by a linear motor 81. The box of the image reading section 80 is shown in the figure, and this box has an light scanning unit and a sensor unit inside. The light scanning unit sequentially irradiates a laser beam as excitation light of a prescribed wavelength region on the stimulable phosphor sheet 93 in the vertical direction and as a result, the stimulable phosphor sheet 93 is scanned. The scanning unit is composed of a laser diode, a polygon mirror, an fθ lens, a motor and the like. The sensor unit receives photo-stimulated luminescence from the stimulable phosphor sheet 93 as vertical and linear luminescence and performs, photoelectric conversions. The sensor unit is composed of a light guiding plate, a light condensing tube and a photo multiplier and the like. The box of the image reading section 80 has an erasing light irradiating mechanism therein which irradiates erasing light of a prescribed wavelength region.

The method for using the radiation image reading apparatus 1 and the operation thereof will be described in the following.

In the initial state prior to insertion of the cassette 90 in the insertion opening 23, the elevator platform 41 is positioned at the home position which is the highest point within the movable range; the two guide portions 51 are at the home position in which they are furthest apart within the movable range; the moving plate 61 is at the home position which is the rearmost position within the movable range; the image reading section 80 is positioned at the home position which is the rightmost position within the movable range; and the insertion opening 23 is closed using the shutter member 28.

First, the user inserts the cassette 90 into the insertion opening 23 with the back base 92 facing towards the back side. The back side of the insertion opening 23 has a projecting portion 25 and thus when the cassette 90 is inserted into the insertion opening 23, the back surface of the cassette 90 comes in contact with the projecting portion 25 and thus the cassette 90 can be easily positioned in the insertion opening 23. In addition there is also a projecting portion 25 on the right side of the insertion opening 23 and thus the right side surface of the cassette 90 comes in contact with the projecting portion 25 and so positioning of the cassette 90 in the insertion opening 23 is easy and as a result quicker and simpler insertion of the cassette 90 in the insertion opening 23 becomes possible.

When the user inserts the cassette 90 into the insertion opening 23, the rollers 31 are pressed to the rear by the cassette 90 and this generates reaction force on the flat metal spring 30. The cassette 90 is pinched between the rollers 31 and the side plate 24 by the reaction force from the flat metal spring 30. In addition, when the user releases the cassette 90, the cassette 90 drops due to gravity and the cassette 90 is loaded on the shutter member 28. The rollers 31 rotate so as to follow the cassette 90.

If the cassette 90 is inserted into the insertion opening 23 with the front base 91 of the cassette 90 towards the back side, the bar code on the cassette 90 cannot be read by the bar code reader and thus the shutter member 28 remains closed. In this case, the user may remove the cassette 90 from the insertion opening 23 upwardly and reverse the back, and front surfaces of the cassette 90 and then re-insert the cassette 90 into the insertion opening 23.

Furthermore, even if the back and front surfaces of the cassette 90 are correctly inserted in the insertion opening 23, if the cassette 90 is too far to the left, the bar code on the cassette 90 cannot be read by the bar code reader and thus the shutter member 28 remains closed. In this case the user may move the cassette 90 to the right while the cassette 90 is in the insertion opening 23.

When the cassette 90 is loaded on the shutter member 28 and the bar code on the cassette 90 cannot be read by the bar code reader, the shutter member 28 moves the axle member to the centre and rotates it downwards using the open-close motor 33 and the shutter member 28 is thereby opened. When the shutter member 28 is opened, the cassette 90 falls due to gravity and the cassette 90 is loaded on the elevator platform 41.

Next, the elevator platform 41 and the cassette 90 are lowered by the elevating motor 42 and when the cassette 90 is positioned between the guide portions 51 the elevating motor stops.

Next, the guide portions 51 are allowed to approach each other in the horizontal direction by the width adjusting motor 52 and the cassette 90 is pinched by the guide portions 51. The position of the cassette 90 in the horizontal direction is thereby correctly adjusted.

Next, the elevator platform 41 is lowered by the elevating motor 42, but the cassette 90 is lowered along with the elevator platform 41 while being guided by the guide portions 51. When the entire cassette 90 is inserted into the housing 2, the shutter member 28 is closed by the open-close motor 33.

Next, a ball screw 74 is rotated by a motor 77 and the moving body 73 is raised. The raising of the moving body 73 causes the link mechanism 65 to open and the moving plate 61 is moved frontward in a state substantially parallel to the back surface of the housing 2. When the moving plate 61 is moved frontward, the moving plate 61 comes in, contact with the back base 92 of the cassette 90 and the back base 92 sticks to the magnet 60.

Next, the engaged engagement portion of the cassette 90 is released by the lock releasing mechanism and the front base 91 and the back base 92 can be separated.

Next, when the ball screw 74 is rotated in the reverse direction by the motor 77, the moving body 73 is lowered and the link mechanism 65 is closed and the moving plate 61 is moved backward in a state substantially parallel to the back surface of the housing 2. Because the back base 92 is stuck to the magnet 60, the moving plate 61 as well as the back base 92 and the stimulable phosphor sheet 93 are also moved backward, and as a result, the back base 92 is separated from the front base 91.

When the moving plate 61 reaches the home position in the back and the stimulable phosphor sheet 93 is exposed while being open frontward, the image reading section 80 moves in front of the stimulable phosphor sheet 93 in the horizontal direction using the linear motor 81. During the movement of the image reading section 80, the stimulable phosphor sheet 93 is scanned vertically by a laser beam from the light scanning unit, and the photo-stimulated luminescence from the stimulable phosphor sheet 93 is received by the sensor unit. When the laser beam is irradiated on the stimulable phosphor sheet 93, photo-stimulated luminescence the quantity or intensity of which is proportionate to the radiation energy stored in the stimulable phosphor sheet 93 is emitted. Scanning by the light scanning unit is performed and the photo-stimulated luminescence emitted from the stimulable phosphor sheet 93 is received by the sensor unit and subjected to photoelectric conversion. As a result, the intensity distribution of the photo-stimulated luminescence on the surface of the stimulable phosphor sheet 93 is obtained as image data and the radiation image recorded on the stimulable phosphor sheet 93 becomes image data. The obtained image data may be outputted to an image storing device, an image display device or an image output device.

When the image reading section 80 reaches the left end of the stimulable phosphor sheet 93, the image reading section 80 moves to the home position on the right side with the erasing light radiating mechanism in a working state. As a result, the erasing light enters the stimulable phosphor sheet 93 and the radiation energy remaining in the stimulable phosphor sheet 93 is released by the erasing light.

When the image reading section 80 reaches the home position, the moving body 73 is raised by the motor 77 and the link mechanism 65 is opened and the moving plate 61, moves frontward in a state substantially parallel to the back surface of the housing 2. When the moving plate 61 moves frontward and the back base 92 fits into the front base 91, the lock releasing mechanism causes the engagement portions of the cassette 90 to engage. Next, when the ball screw 74 is rotated in the reverse direction by the motor 77, the moving plate 61 moves backward and the magnet 60 is removed from the back base 92.

Next, the shutter member 28 is opened by the open-close motor 33. The elevator platform 41 is then raised to a position lower than the home position by the elevating motor 42 and the guide portions 51 are separated by the width adjusting motor 52 and the pinching of the cassette 90 by the guide portion 51 is released. In addition, the elevator platform 41 is once again moved to the home position by the elevating motor 42 and a portion of the upper side of the cassette 90 is ejected from the insertion opening 23. When the cassette 90 comes out of the insertion opening 23, the user takes the cassette 90 out of the insertion opening 23.

As described above, in this embodiment, because the insertion opening 23 is closed by the shutter member 28, the cassette 90 can be moved horizontally along the insertion opening 23 in a state where the cassette 90 has been inserted into the insertion opening 23 and has not been dropped to the elevator platform 41. Thus the position of the cassette 90 in the horizontal direction can be quickly and simply adjusted.

In addition, because there is a projecting portion 25 from the back of the insertion opening 23 to the right thereof, the cassette 90 can be positioned in the insertion opening 23 by simply coming in contact with the projecting portion 25, and thus the cassette 90 can be quickly and simply inserted into the insertion opening 23.

Providing the projecting portion 25 along the periphery of the insertion opening 23 is beneficial in the case where the height from the floor to the upper surface of the housing 2 is low, and particularly when this height is 700 mm or less. When the height to the upper surface of the housing is around 1000 mm or more like the image reading apparatus of the prior art and when a user of average height (such as 170 cm) attempts to insert the cassette into the insertion opening on the upper surface of the housing with the short sides (the 14-inch side when the cassette 90 is the maximum size of 14 inches×17 inches) of the cassette 90 positioned vertically, the user need lift up the cassette 90. Consequently, the cassette must be inserted while aiming at the insertion opening. If the height to the upper surface 22 is low being 700 mm or less as the case in this embodiment, when the user of average height puts the short sides of the cassette 90 vertically and attempts to insert the cassette 90 into the insertion opening 23, it is inserted while being held by the user's hand (hung from the user's hand), and it becomes difficult for the cassette 90 to be directed into the insertion opening 23. As a result, because the projecting portion 25 is provided along the periphery of the insertion opening 23 as is the case in this embodiment, even if the user carries the cassette 90 hung from the user's hand, it becomes possible to insert the cassette 90 into the insertion opening 23 without making special effort to aim the cassette 90 at the insertion opening 23, only by allowing the cassette to come in contact with the projecting portion 25. For this reason, cassette 90 can be quickly and easily inserted into the insertion opening 23. Further, it is possible to aim the cassette single-handed.

Here, the average height of users is assumed to be 170 cm, however when the average height is higher than that, it is still effective even the height of the upper surface is a little higher than 700 mm.

Furthermore, if the height from the floor to the upper surface 22 of the housing 2 is, low, because the user can easily insert the cassette 90 in the insertion opening 23 while the user carries the cassette 90 hung from the user's hand, it is no longer necessary to stop and stand in front of the predetermined face (front face) of the image reading apparatus 1 when inserting the cassette 90, and the cassette 90 can be easily inserted from an upper position at any of the four directions of the image reading apparatus 1. As a result, the degree of freedom in location and direction for installing the image reading apparatus 1 with respect to the operational movement line of the user can be considerably improved and the operation for inserting the cassette 90 can be performed simply and accurately.

Second Embodiment

In the first embodiment, a step was formed between the top surface 26 adjoining the right periphery and the back periphery of the insertion opening 23 and the upper surface adjoining the left periphery and the front periphery of the insertion opening 23 by forming a projecting portion 25 on the upper surface of the housing 2. However, in the second embodiment, as shown in the perspective view of FIG. 9, no projecting portion is formed on the upper surface of the housing 102, but the upper surface 122b which adjoins the front periphery and the left periphery of the insertion opening 123 is sunk so as to be lower than the upper surface 122a which adjoins the back periphery and the right periphery of the insertion opening 123. As a result, a step is formed between the upper surface 122b which adjoins the front periphery and the left periphery of the insertion opening 123 and the upper surface 122a which adjoins the back periphery and the right periphery of the insertion opening 23.

Figure 9:
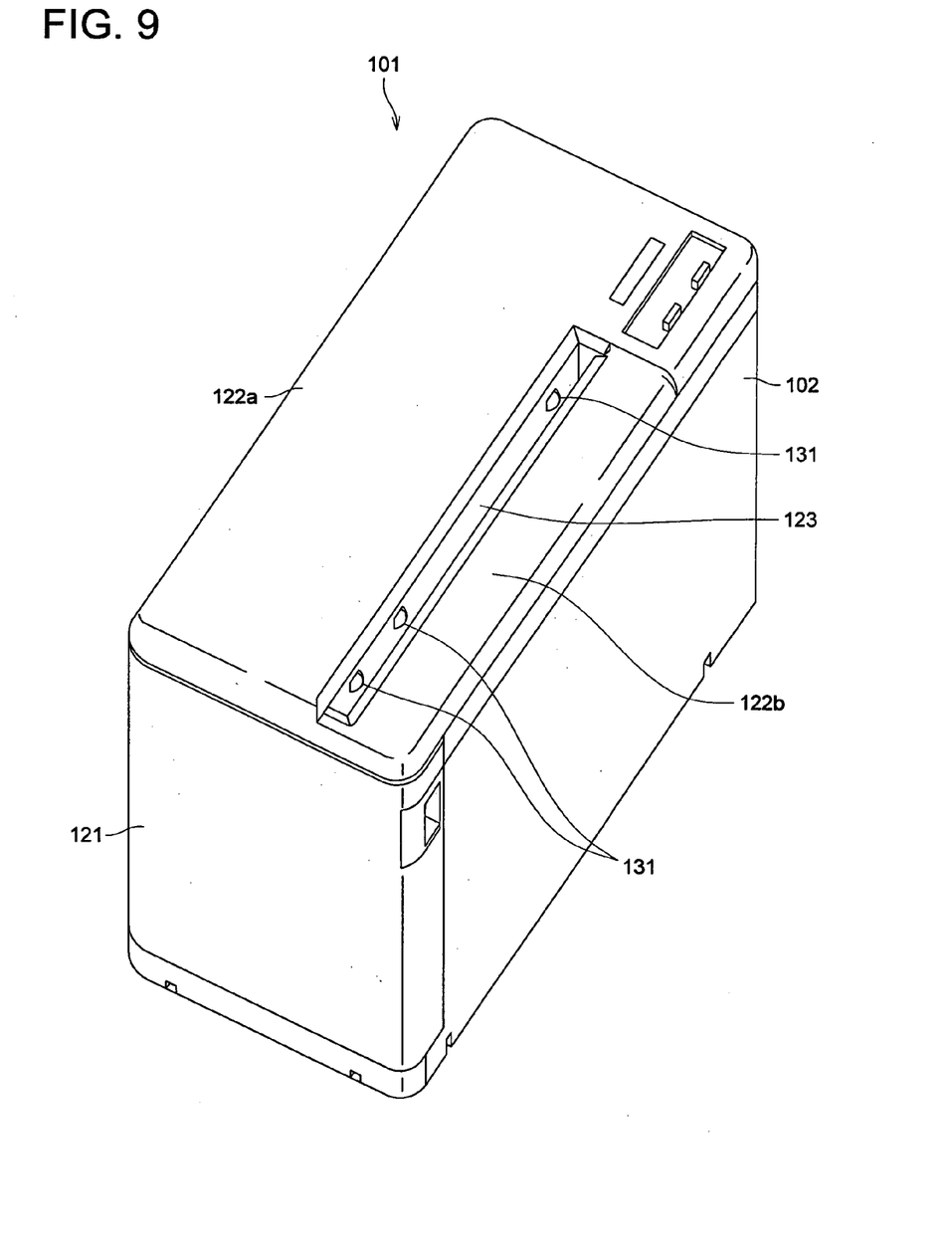
FIG. 9 is a perspective view of the exterior of the radiation image reading apparatus 101 showing the upper surface, the front surface and the left side surface.

In the radiation image reading apparatus 101 shown in FIG. 9, the last two digits are the same for all the parts corresponding to the radiation image reading apparatus 1 of the first embodiment. The radiation image reading apparatus 101 and the radiation image reading apparatus 1 have the same structures for the corresponding parts except for the structures around the insertion opening 23 and the insertion opening 123, and the structures and mechanisms inside the housing 2 and the housing 102 are also the same. For that reason, a description of the structures and mechanism inside the housing 2 has been omitted for the radiation image reading apparatus 101.

MODIFIED EXAMPLE

It is to be noted that this invention is not limited to the above embodiments, and various improvements and modifications in design may be performed provided they do not depart from the spirit of the invention.

In the embodiments described above, the upper surface which adjoins the back periphery and the right periphery of the insertion opening 23 or 123 is higher than the upper surface which adjoins the front periphery and the left periphery of the insertion opening 23 or 123, but conversely, the upper surface which adjoins the back periphery and the right periphery of the insertion opening 23 and 123 may be lower than the upper surface which adjoins the front periphery and the left periphery of the insertion opening 23. In addition, the upper surface adjoining the back periphery of the insertion opening 23 and 123 may be higher than the upper surface adjoining the other peripheries, and further the upper surface adjoining the back periphery, the right periphery and the front periphery may be higher than the upper surface adjoining the left periphery, and still further the upper surface adjoining the back periphery and the front periphery of the insertion opening 23 may be higher than the upper surface adjoining the left periphery and the right periphery. That is to say, the upper surface adjoining at least one of the four peripheries of the insertion opening 23 and 123 may be higher than the upper surface adjoining the other peripheries.

In addition, in the above embodiments, the invention is applied to a radiation image reading device 1 or 101 in which the cassette 90 is inserted into the insertion opening 23 and 123, and after image reading the cassette 90 is ejected from the insertion opening 23 or 123. However, this invention may be applied to a radiation image reading device 1 or 101 in which the cassette insertion opening and the cassette ejection opening are different. Even in the radiation image reading device in which the cassette insertion opening and the cassette ejection opening are different, it is effective if the upper surface adjoining at least one of the four peripheries of the insertion opening is higher than the upper surface adjoining the other peripheries.

Furthermore, in the above embodiments, the insertion openings 23 and 123 are formed on the upper surface of the housings 2 and 102, but they may be formed on other surfaces. Also, the housings 2 and 102 are rectangular box-shaped, but they may have other shapes. For example, the edge portion between the upper surface and the front surface of the housings 2 and 102 may be beveled so as to incline with respect to these surfaces, and the insertion openings 23 and 123 may be formed on this beveled incline surface.

According to this invention, by allowing the cassette to come in contact with a portion of a periphery of the insertion opening that is formed higher, positioning of the cassette at the insertion opening becomes simpler, and thus quicker and easier insertion of the cassette into the insertion opening is possible.

What is claimed is:

1. A floor-standing radiation image reading apparatus for reading a radiation image from a stimulable phosphor provided in a rectangular cassette, the apparatus comprising:

a housing having an elongate rectangular insertion opening formed on an upper surface thereof for inserting the cassette uprightly in a vertical direction, said rectangular insertion opening comprising four peripheral side portions;

wherein a height of the rectangular insertion opening from the floor is approximately 700 mm and at least a part of at least one of the peripheral side portions of the rectangular insertion opening protrudes upwardly above the other peripheral side portions.

2. The apparatus of claim 1;

wherein a surface adjoining said at least one of the peripheral side portions of the rectangular insertion opening is higher than a surface adjoining the other peripheral side portions of the rectangular insertion opening.

3. The apparatus of claim 2;

wherein the surface adjoining said at least one of the peripheral side portions of the rectangular insertion opening is a top surface of a projecting portion formed on the housing.

* * * * *